US009245237B2

(12) United States Patent  (10) Patent No.: US 9,245,237 B2
Hamilton, II et al.  (45) Date of Patent:  Jan. 26, 2016

(54) CREATING DOCUMENTS FROM GRAPHICAL OBJECTS IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2572 days.

(21) Appl. No.: 11/861,242

(22) Filed: Sep. 25, 2007

(65) Prior Publication Data

US 2009/0083623 A1  Mar. 26, 2009

(51) Int. Cl.
| *G06F 17/00* | (2006.01) |
| *G06Q 10/00* | (2012.01) |
| *G06F 3/0481* | (2013.01) |
| *G06F 17/30* | (2006.01) |
| *G06F 19/00* | (2011.01) |

(52) U.S. Cl.
CPC ............ *G06Q 10/00* (2013.01); *G06F 3/04815* (2013.01); *G06F 17/30061* (2013.01); *G06F 19/00* (2013.01)

(58) Field of Classification Search
CPC . G06F 17/30061; G06F 19/00; G06F 19/321; G06F 3/04815; G06Q 10/00; A63F 13/00
USPC ............... 715/277.2, 706, 200, 277, 255, 209
See application file for complete search history.

(56) References Cited

U.S. PATENT DOCUMENTS

| 5,502,576 | A | * | 3/1996 | Ramsay et al. ............... 358/444 |
| 5,778,366 | A |   | 7/1998 | Gillihan et al. |
| 6,119,147 | A |   | 9/2000 | Toomey et al. |
| 6,823,084 | B2 | * | 11/2004 | Myers et al. .................. 382/187 |
| 7,139,982 | B2 | * | 11/2006 | Card et al. ..................... 715/786 |
| 7,565,012 | B2 | * | 7/2009 | Kang ............................ 382/176 |
| 7,694,214 | B2 | * | 4/2010 | Liu et al. ....................... 715/203 |
| 7,778,994 | B2 | * | 8/2010 | Raman et al. ................. 707/706 |
| 8,010,474 | B1 | * | 8/2011 | Bill ................................. 706/46 |
| 2002/0113823 | A1 | * | 8/2002 | Card et al. .................... 345/776 |
| 2002/0118230 | A1 | * | 8/2002 | Card et al. .................... 345/776 |
| 2004/0128350 | A1 | * | 7/2004 | Topfl et al. ................... 709/204 |

(Continued)

OTHER PUBLICATIONS

Mackay, Wendy E., "Augmented Reality: Linking real and virtual worlds a new paradigm for interacting with computers", *Proceedings of AVI'98, ACM Conference on Advanced Visual Interfaces*, ACM Press, New York, (1998).

(Continued)

*Primary Examiner* — Thu Huynh
(74) *Attorney, Agent, or Firm* — DeLizio Law, PLLC

(57) ABSTRACT

Described herein are processes and devices that create and manage documents in a virtual universe. One of the devices described is a virtual document converter. The virtual document converter analyzes a set of one or more graphical objects of a virtual document in a virtual universe. The virtual document presents document content. The virtual document converter determines format information for generating a document file. The virtual document converter parses the document content of the virtual document. The virtual document converter generates the document file with the parsed document content and the determined format information.

17 Claims, 11 Drawing Sheets

(56) References Cited

U.S. PATENT DOCUMENTS

| | | |
|---|---|---|
| 2005/0198124 A1 | 9/2005 | McCarthy |
| 2006/0123127 A1 | 6/2006 | LittleField |
| 2006/0285772 A1* | 12/2006 | Hull et al. .................. 382/305 |
| 2007/0143669 A1* | 6/2007 | Royer ........................ 715/523 |
| 2008/0081701 A1* | 4/2008 | Shuster ...................... 463/42 |
| 2009/0125534 A1* | 5/2009 | Morton et al. ............. 707/100 |
| 2010/0100727 A1* | 4/2010 | Suominen .................. 713/155 |
| 2010/0166309 A1* | 7/2010 | Hull et al. .................. 382/176 |
| 2010/0332980 A1 | 12/2010 | Sun et al. |
| 2011/0066928 A1 | 3/2011 | Karlsson |

OTHER PUBLICATIONS

"U.S. Appl. No. 11/861,264 Office Action", Oct. 4, 2010, 17 pages.

"U.S. Appl. No. 11/861,264 Final Office Action", Mar. 31, 2011, 16 pages.

* cited by examiner

CREATING DOCUMENTS FROM GRAPHICAL OBJECTS IN A VIRTUAL UNIVERSE

BACKGROUND

1. Technical Field

Embodiments of the inventive subject matter relate generally to virtual universe systems, and more particularly to creating and managing documents in a virtual universe.

2. Background Art

Virtual universe applications allow people to socialize and interact in a virtual universe. A virtual universe ("VU") is a computer-based simulated environment intended for its residents to traverse, inhabit, and interact through the use of avatars. Many VUs are represented using 3-D graphics and landscapes, and are populated by many thousands of users, known as "residents." Other terms for VUs include metaverses and "3D Internet."

SUMMARY

Described herein are processes and devices that create and manage documents in a virtual universe. One of the devices described is a virtual document converter. The virtual document converter analyzes a set of one or more graphical objects of a virtual document in a virtual universe. The virtual document presents document content. The virtual document converter determines format information for generating a document file. The virtual document converter parses the document content of the virtual document. The virtual document converter generates the document file with the parsed document content and the determined format information.

BRIEF DESCRIPTION OF THE SEVERAL VIEWS OF THE DRAWING(S)

The present embodiments may be better understood, and numerous objects, features, and advantages made apparent to those skilled in the art by referencing the accompanying drawings.

DESCRIPTION OF ILLUSTRATIVE EMBODIMENTS

The description that follows includes exemplary systems, methods, techniques, instruction sequences and computer program products that embody techniques of embodiments of the invention(s). However, it is understood that the described embodiments of the invention(s) may be practiced without these specific details. For instance, although examples may refer to converting graphical text objects into font text formats by using Optical Character Recognition (OCR), other examples might use other digital image processing or pattern recognition techniques. In other instances, well-known instruction instances, protocols, structures and techniques have not been shown in detail in order not to obfuscate the description.

Introduction

Figure 1:
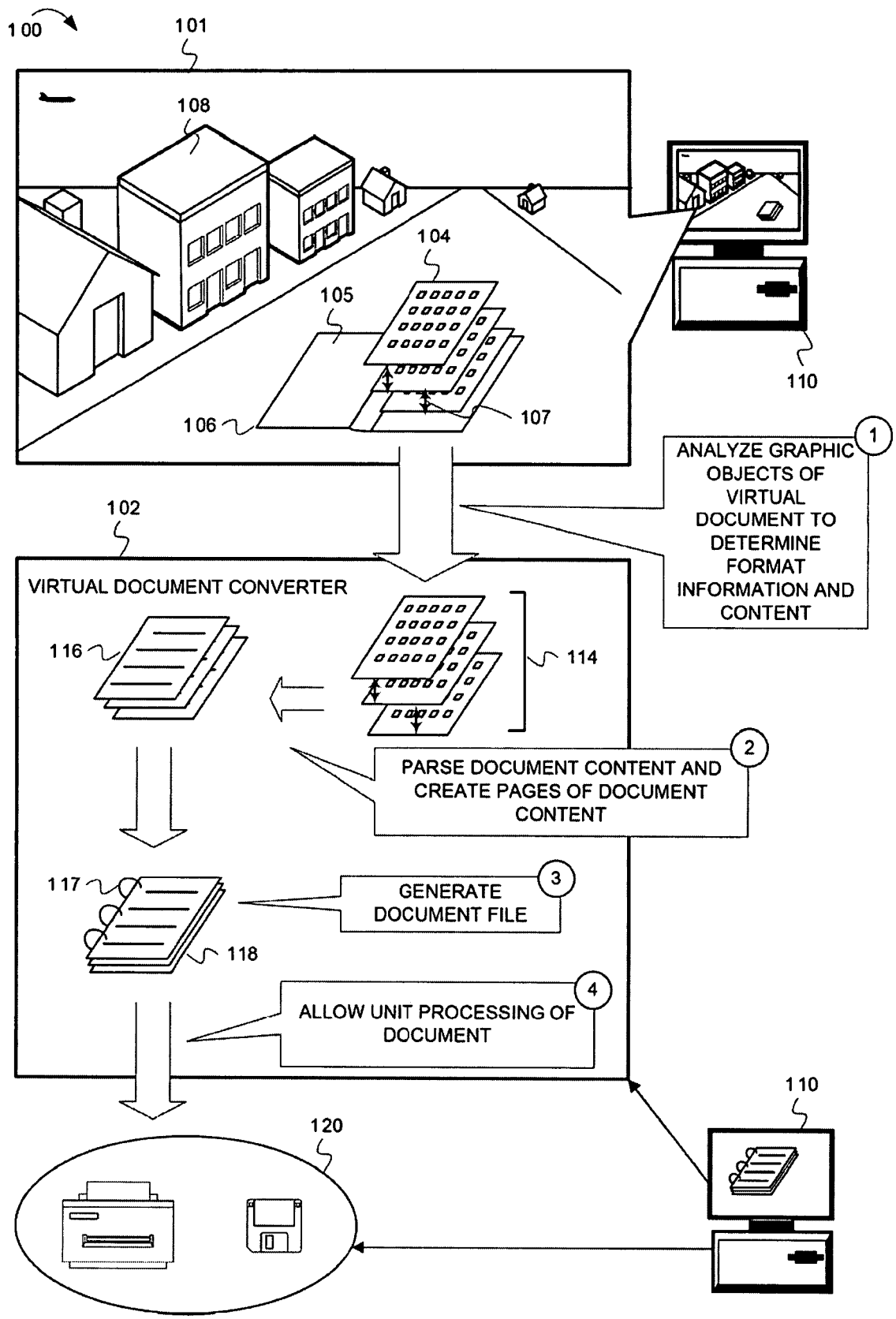
FIG. 1 is an illustration of an example virtual document converter 102 within an operating environment 100.

As VU environments become increasingly popular for all types of entertainment and commerce, problems have arisen in dealing with virtual documents in three dimensional environments. More specifically, outside of a virtual universe, a computer document file ("document") is formatted in such a way that the document may be processed as an entire unit. For example, word-processor document applications may create documents (e.g., .doc, .pdf, .txt, etc.) that include text that is embedded into the documents. The embedded text is encoded in a way that describes the text's relationship to the document as a whole. This allows the document to be treated as a singular unit—it may be printed in its entirety; it has a viewable multi-page structure sometimes with headers, indexes, columns, and page numbers; it may be transferred and saved as a single file; etc. However, in the virtual universe, a virtual document is created to have the visual look of a document, like a graphical representation of a book with some graphical page layers, but the virtual document's page layers are not formatted like the pages of a document. Thus, text based media in the virtual universe cannot be viewed, edited, and printed in the same way as documents. FIG. 1 shows how some devices may work to create a document from a virtual document in a virtual universe.

FIG. 1 is an illustration of an example virtual document converter 102 within an operating environment 100. In FIG. 1, the operating environment 100 includes one or more computers 110 to access a virtual universe 101. The virtual universe 101 includes various graphical objects 108 (e.g., buildings, avatars, vehicles, etc.) that make up the virtual universe. One such graphical object includes a virtual document 106. The virtual document 106 has the appearance of a book, with a cover 105 and page layers 104. The page layers 104 are graphical layers (e.g., JPEG format, GIF format, etc.) that appear to have a text format, but the text that appears on the page layers is actually a pixilated representation of text, and is therefore not text. Furthermore, the page layers 104 do not have a document structure. For example, a page layer 104 may have a direct connection 107 to both a previous page layer and a subsequent page layer for browsing from one page layer to the next, but the virtual document 106 as a whole does not have an overall binding structure that allows all the page layers to be processed at once like a document. In other words, the virtual document, in this example, is a collection of graphical objects held loosely together only for browsing from one graphical object to the next.

The virtual document converter 102, in stage "1", analyzes the graphical objects and determines the format of the graphical objects. For example, the virtual document converter 102 recognizes that the page layers 104 may be in a JPEG format. The page layers 104 may be isolated for processing (e.g., extracted, copied, etc.). The virtual document converter 102 may keep track of any type of relationship between the page layers 104 to keep them in an organized stack 114.

In stage "2", the virtual document converter 102 parses the document content and creates document pages 116 with text. For example, the virtual document converter 102 selects a proper conversion technique to convert the graphical representations of text on each page layer into actual text, with font formats, size formatting, etc. One such technique includes Optical Character Recognition (OCR). Other techniques include Digital Character Recognition (DCR), electronic pattern recognition algorithms, mechanical character replacement, and digital image processing. The virtual document converter 102 then embeds the text into document pages 116.

In stage "3" the virtual document converter 102 generates a document 118. For example, the virtual document converter 102 applies coding that will bind the pages 116 into the document 118. Thus the document 118 would include the proper coding, or binding 117, to allow unit processing of the document 118.

In stage "4", the virtual document converter 102 allows unit processing of the document 118. Unit processing may include processing commands 120 for printing all or part of the pages of the document 118. Unit processing commands 120 may also include saving, copying, transferring, etc., the document 118, both inside the virtual universe 101 and outside the virtual universe 101, such as to a disk drive on the computer 110, or onto a network (not shown).

Example Operating Environments

Figure 2:
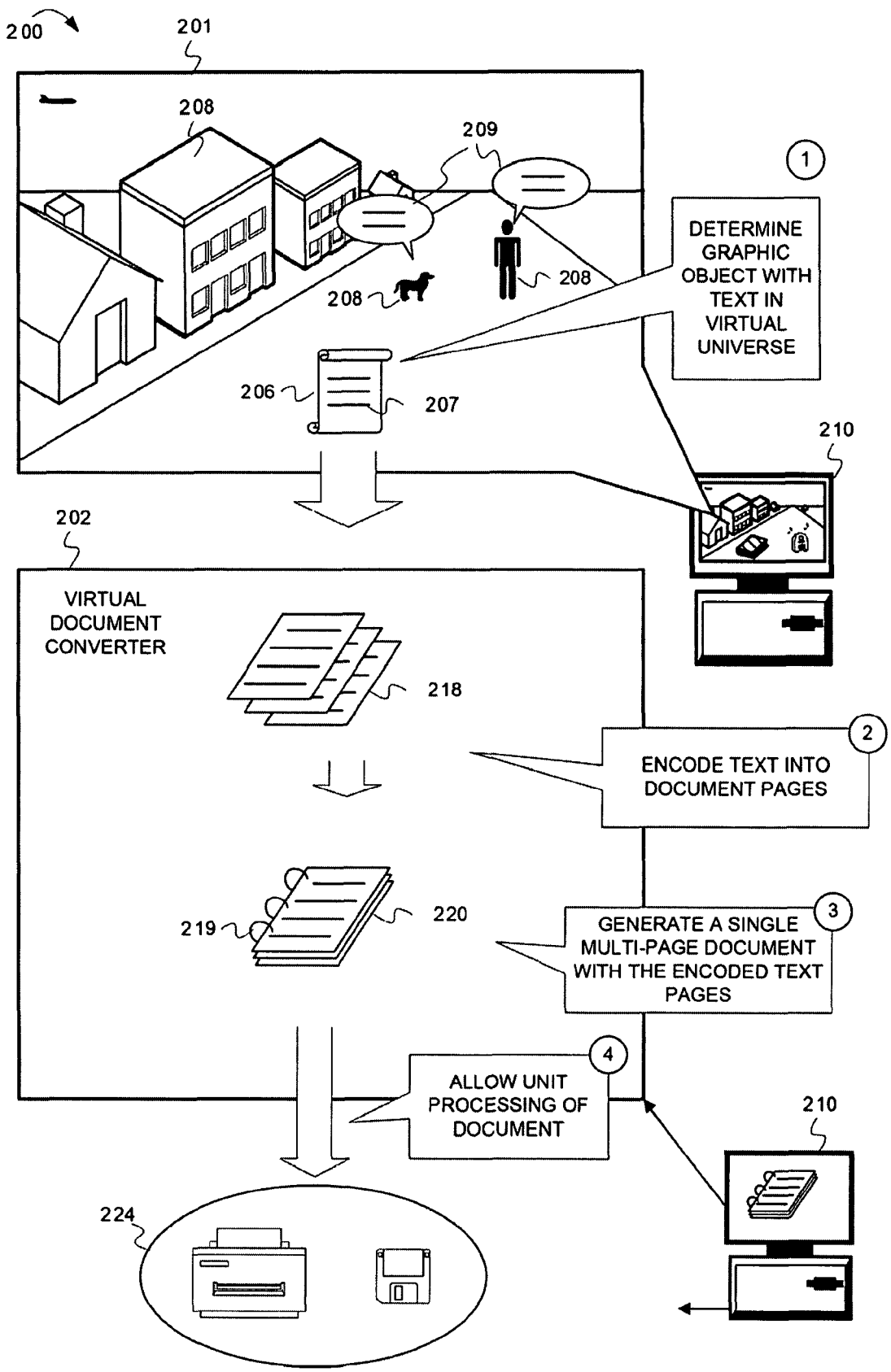
FIG. 2 is an example illustration of generating a single, multi-page document from virtual objects with text.

This section describes example operating environments and networks and presents structural aspects of some embodiments. More specifically, this section includes discussion about virtual document converter operating environments, virtual document converter architectures, virtual document converter operating environments, virtual document converters, and virtual document management Example of Generating a Single, Multi-Page Document from Virtual Objects with Text FIG. 2 is an example illustration of generating a single, multi-page document from virtual objects with text. In FIG. 2, an operating environment 200 includes a virtual document converter 202, and one or more computers 210 configured to access a virtual universe 201. The virtual universe includes graphical objects 208 (e.g., buildings, avatars, vehicles, etc.), that make up the virtual universe 201, for example a document graphic object with text, such as a virtual document 206. The virtual document 206 is different from the virtual document 106 shown in FIG. 1. Specifically, in FIG. 2, the virtual document 206 includes some text 207. Nevertheless, the virtual document 206 does not have a page structure that allows for the document to be processed as a unit. For example, there is no binding of pages existent in the virtual document 206 that would allow the unit to be processed as a whole.

In stage "1", the virtual document converter 202 determines (e.g., isolates, selects, etc.) the virtual document 206 and analyzes the format to determine the graphical elements and the text elements of the virtual document. In stage "2", the virtual document converter 202 extracts the text 207 and encodes it into document pages 218. In stage "3", the virtual document converter 202 generates a single, multi-page document 220 from the document pages 218. For example, the virtual document converter 202 may apply the binding 119, or code that provides a bound sequential page structure, where all of the pages 218 may be processed as a document unit.

In stage "4", the virtual document converter 202 allows unit processing of the document 220. Unit processing may include processing commands 224 for printing all or part of the pages of the document 220. Unit processing commands 224 may also include saving, copying, transferring, etc., the document 220, both inside the virtual universe 201 and outside the virtual universe 201, such as to a disk drive on the computer 210, or onto a network (not shown).

FIG. 2 only illustrates one virtual document 206. However, the virtual universe 201 could contain a plurality of virtual documents 206 that the virtual document converter 202 could convert into a single, multi-page document, or into a plurality of multi-page documents.

The virtual universe 201 could also contain more than one document graphic object with text. For example, a series of chat screens 209 could appear in the virtual universe 201, such as talk-bubbles that appear over the heads of avatars as they speak (shown), or as separate private text channels (not shown). The chat screens could each contain text or a mixture of text and graphics. The virtual document converter 202 could generate one or more multi-page documents that combine content from the chat screens. Furthermore, the virtual document converter 202 could incorporate contextual information, or metadata into the document 220. The metadata could be available from the virtual universe 201, but hidden from view in the virtual universe 201. The metadata might include a region name, location coordinates, avatar names and their contact info, or other information available to the virtual document converter 202 as part of, or in relationship to, the virtual universe 201. The metadata could also be obtained from outside the virtual universe 201, such as from the computer 210, or from a network (not shown) or devices on the network.

Example Virtual Document Converter Architecture

Figure 3:
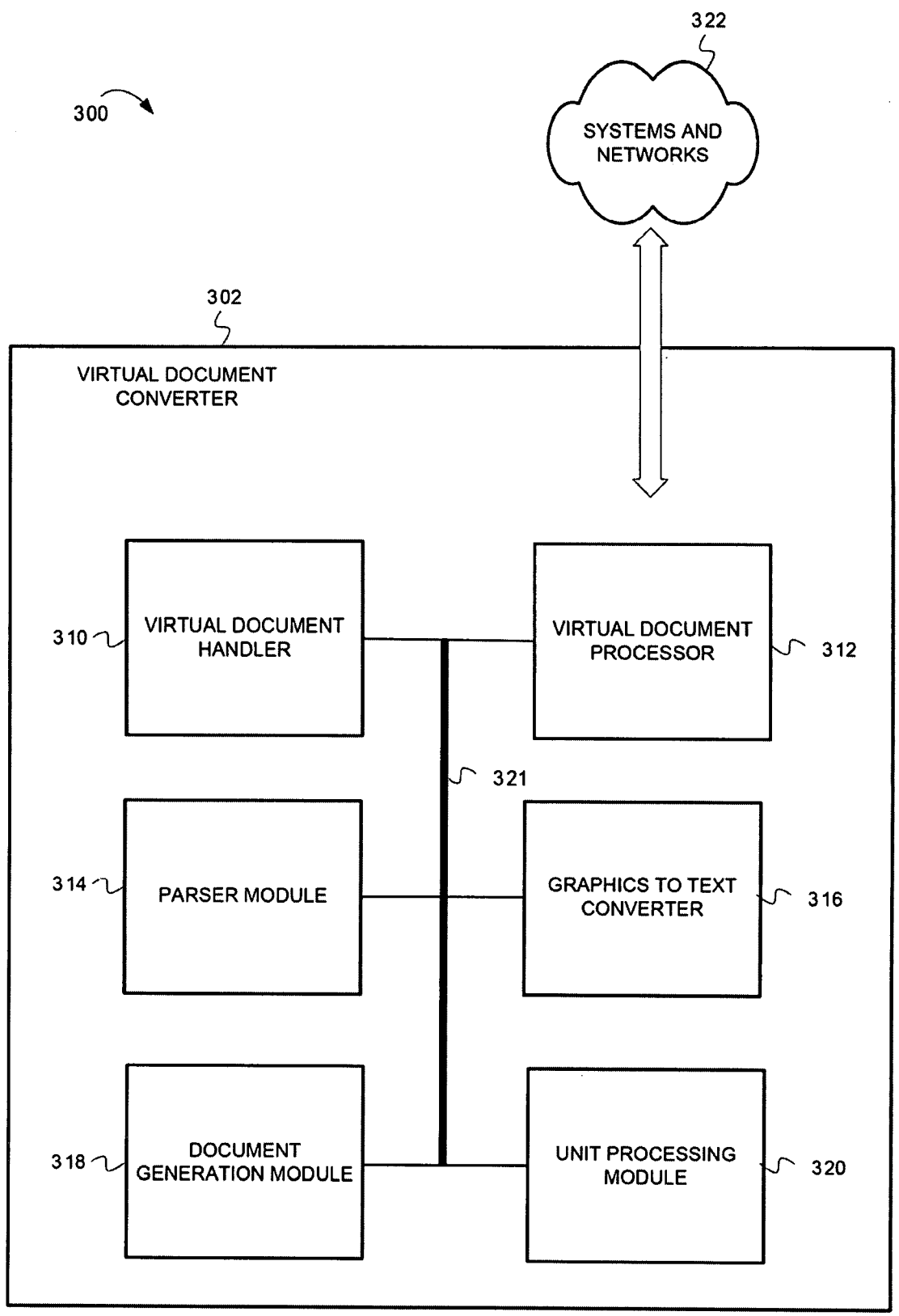
FIG. 3 is an illustration of an example virtual document converter architecture 300.

FIG. 3 is an illustration of an example virtual document converter architecture 300. In FIG. 3, the virtual document converter architecture 300 may include a virtual document converter 302 configured to interface with systems and networks 322.

The virtual document converter architecture 300 may include a virtual document handler 310 configured to manage the movement and properties of a document in a virtual universe. For example, the virtual document handler 310 may extract content (e.g. graphical layers, text, etc.) from a graphical object in a virtual universe, such as a virtual document. The virtual document handler 310 may also move documents around in the virtual universe, track those documents, etc. The virtual document handler 310 may also insert documents into a virtual universe as bound virtual documents.

The virtual document converter architecture 300 may also include a virtual document processor 312 configured to perform various functions to analyze and use document content from graphical objects in the virtual universe. For example, the virtual document processor 312 could analyze information presented as document content, like pixilated text graphics in a virtual document, to create word-processor documents. The virtual document processor 312 may also analyze and process content from a document, such as a word-processor document, to create bound virtual documents that may be processed as a unit document in the virtual universe.

The virtual document converter architecture 300 also includes a parser module 314 configured to parse the document content and encode text into pages of a document. For example, the parser module 314 may determine how and where to embed virtual document content into a document page. The parser module 314 may format pages with columns, page numbers, etc.

The virtual document converter architecture 300 also includes a graphics to text converter 316 configured to convert document content that is in graphical format into text format. Conversion techniques include OCR, and other graphic-to-text conversion techniques. Furthermore, the graphics to text converter 316 may be configured to convert text into a graphical format.

The virtual document converter architecture 300 also includes a document generation module 318 configured to generate document files with document content. For example, the document generation module 318 could bind pages with encoded text, converted from document content, into a multi-page document by generating code that connects document pages together as a whole document unit.

The virtual document converter architecture 300 also includes a unit processing module 320 configured to provide options for processing a document as a unit in a virtual universe. The unit processing module 320 may provide drop-down options from a virtual document to allow processing of the virtual document, such as printing, viewing or modifying text from a virtual document.

The virtual document converter architecture 300 also includes a communication interface 321 configured to facilitate communication between the components of the virtual document converter 302.

Each component shown in the virtual document converter architecture 300 is shown as a separate and distinct element. However, some functions performed by one component could be performed by other components. For example, the virtual document processor 312 could parse, or assist in parsing, document content as well as perform other functions necessary to generate a document file. Furthermore, the components shown may all be contained in the virtual document converter 302, but some, or all, may be included in, or performed by, other devices on the systems and networks 322. Furthermore, the virtual document converter architecture 300 may be implemented as software, hardware, machine-readable storage media, or any combination thereof.

Example of Converting a Document File into a Multi-Page, Bound Virtual Document

Figure 4:
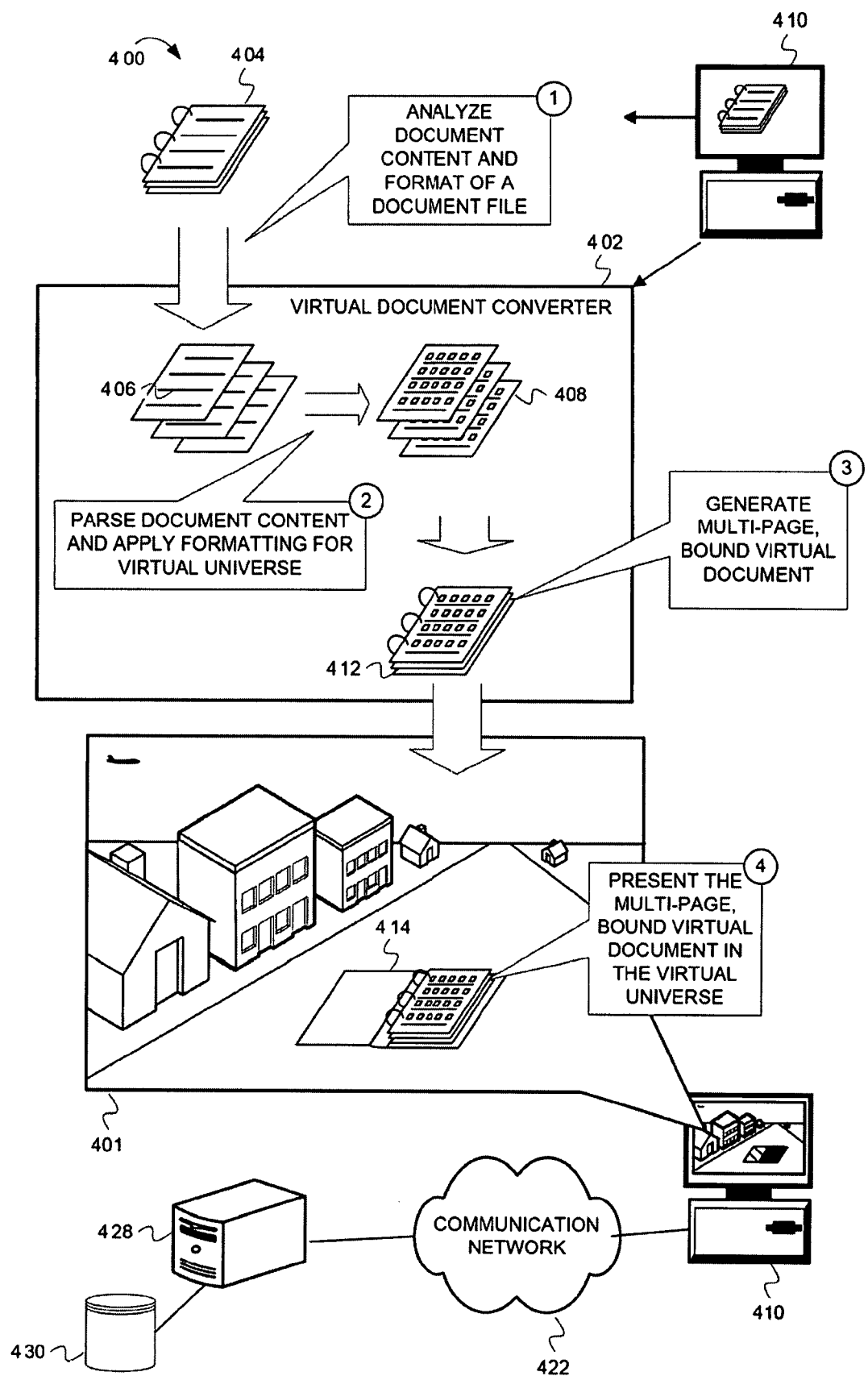
FIG. 4 is an example illustration of converting a document file into a multi-page, bound virtual document.

FIG. 4 is an example illustration of converting a document file into a multi-page, bound virtual document. In FIG. 4, an operating environment 400 includes a virtual document converter 402 to interface with a computer 410 and a virtual universe 401. The computer 410 includes a document file 404 that includes one or more document pages files bound together as a whole unit.

In stage "1", the virtual document converter 402 analyzes the document content and the format of the document file. For example, the virtual document converter 402 could analyze the document file type to determine that it is a word-processor document (e.g., .doc, .pdf, etc.) associated with a specific word-processing application on the computer 410. The virtual document converter 402 could also determine a specific number of pages, font types, column numbers, etc.

In stage "2", the virtual document converter 402 parses the document content on the document file pages 406, and formats the content for displaying in the virtual universe 401. For example, the virtual document converter 402 could convert the document pages 406 to a textured graphic/document stack 408 (e.g., JPEG2000, GIF, etc.), for example by using a graphical conversion application. Alternatively, if the virtual universe 401 handles text, then the virtual document converter 402 may instead leave the document pages as text and format the document pages 406 sufficient to make the document content accessible in a virtual universe application, like a web browser. The result is a group of virtual document pages 408 formatted for presentation in the virtual universe 401.

In stage "3", the virtual document converter 402 generates a multi-page, bound virtual document 412. The virtual document converter 402 binds the virtual document pages 408 to make a multi-page, bound virtual document 412 ("bound virtual document"), with a sequential page structure, where all of the virtual pages 408 may be processed as a single unit in the virtual universe 401. For example, the virtual document converter 402 could store the pages in a database 430 with each page having an entry in the database that is tied to each other entry, such as through a key, to create a sequential page order. The database 430 could be connected to a server 428. The computer 410 could access the server 428 via a communication network 422.

In stage "4", the virtual document converter 402 presents the bound virtual document 412 in the virtual universe. For example, the virtual document converter 402 could import the multi-page, bound virtual document 412 and associate a graphical cover 414 to encase the bound virtual document 412, to make the bound virtual document 412 look like a document graphic in the virtual universe 401.

Example of Providing Unit Processing Options for a Virtual Document

Figure 5:
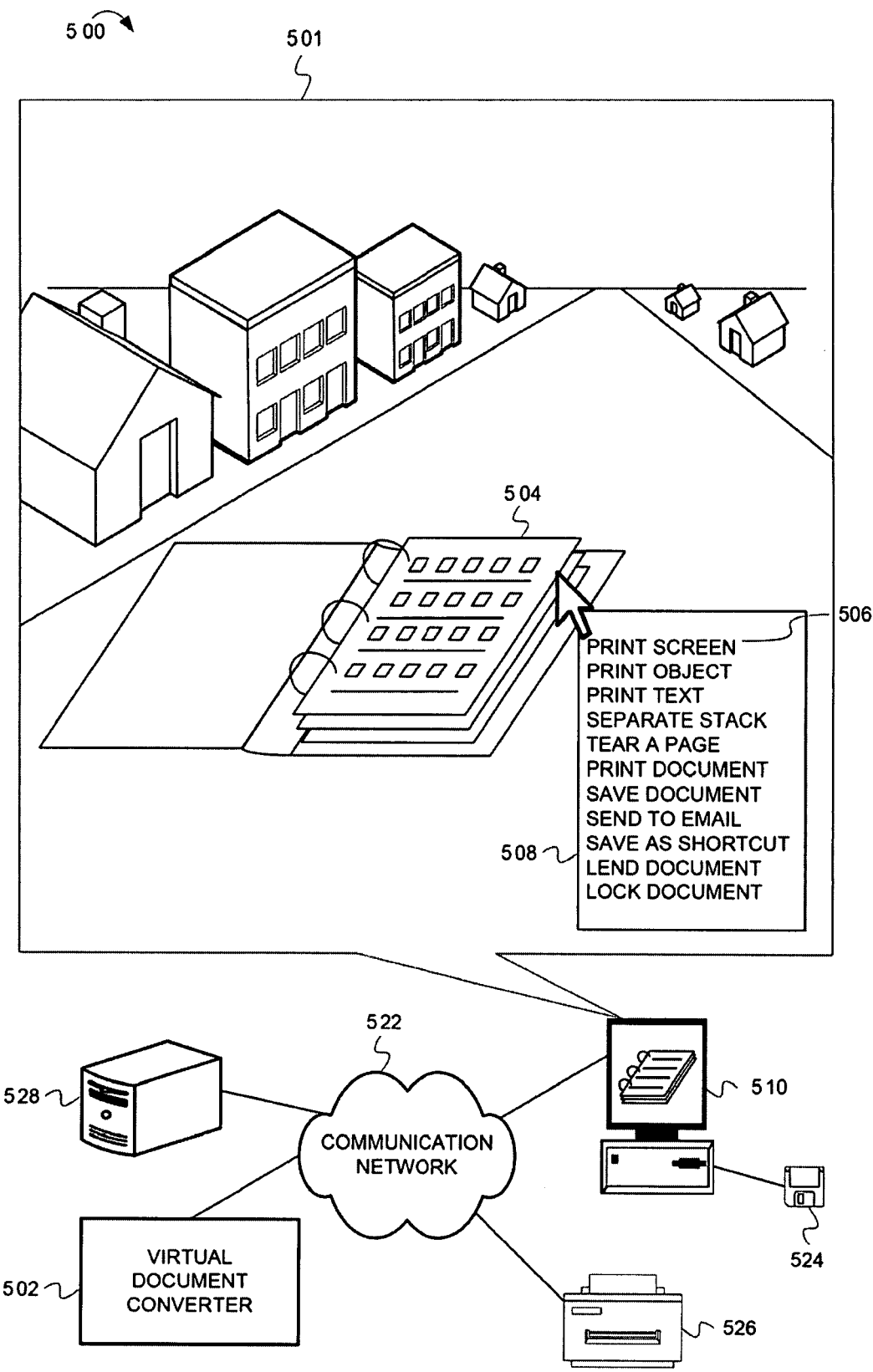
FIG. 5 is an example illustration of providing unit processing options for a virtual document.

FIG. 5 is an example illustration of providing unit processing options for a virtual document. In FIG. 5, an operating environment 500 includes a computer 510 to access a virtual universe 501. The computer 510 is connected to a virtual document converter 502 via a communication network 522. A server 528 is also connected to the communication network 522 as well as other devices, like a printer 526. In some embodiments, the computer 510 includes the virtual document converter 502, or is connected to the printer 526 directly through a cable or wire. Also, the computer 510 could perform the functions of a client and server. Furthermore, the computer 510 may interface with an external storage device 524, like a disk, a flash drive, or a hard drive.

The virtual universe 501 includes a virtual document 504 that has been configured, according to embodiments of the invention, to allow document processing. For example, the virtual document 504 is configured to display a processing options screen 508. The screen 508 may be made to appear in many different ways. For example, the virtual document converter 502 could provide the screen 508 in response to a mouse click, or other similar event. The virtual document converter 502 could provide a wide-range of processing options 506 including, but not limited to, the following:

- print a screen shot;
- print graphics from an object;
- print text from an object;
- separate the page stack into distinct pages;
- tear a page to transfer it, such as to an avatar's inventor;
- print one or more pages from the virtual document;
- save the virtual document to a document file;
- send the virtual document to email as an attached document file;
- create a shortcut to the virtual document;
- lend the virtual document;
- lock the virtual document; and
- retrieve the virtual document from a borrower.

Example of Managing A Virtual Document in a Virtual Universe

Figure 6:
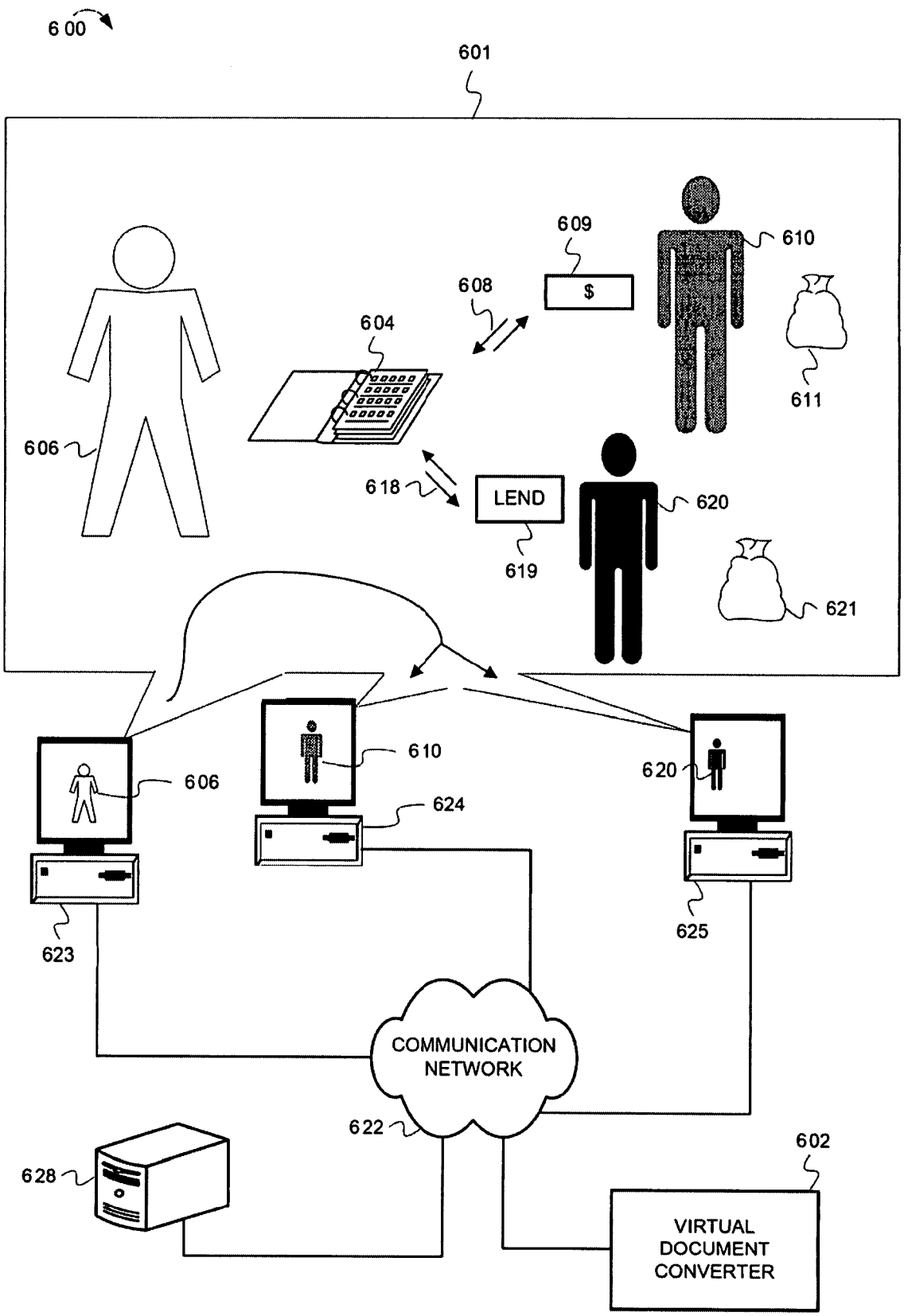
FIG. 6 is an example illustration of managing a virtual document in a virtual universe.

FIG. 6 is an example illustration of managing a virtual document in a virtual universe. In FIG. 6, an operating environment 600 includes one or more client devices 623, 624, 625 ("clients") connected to a communication network 622. A server device 628 ("server") is also connected to the communication network 622. The server 628 hosts a virtual universe 601. A virtual document converter 602 is also connected to the communication network 622. The clients 623, 624, 625 access the virtual universe 601 via the communication network 622.

Several avatars 606, 610, 620 reside in the virtual universe 601. The clients 623, 624, 625 control the avatars 606, 610, 620. In the virtual universe 601 a first avatar 606 lends or sells a virtual document 604 to any one of a second avatar 610 or a third avatar 620. Specifically, the first avatar 606 sells the virtual document 604, or a copy of the virtual document 604, to the second avatar 610 for a form of virtual currency 609, via a commercial transaction 608. The second avatar 610 may store the virtual document 604, or a copy of the virtual document 604, in a virtual storage container 611 that belongs to the avatar, like a sack, an inventory chest, etc. The commercial transaction 608 and virtual currency 609 are becoming increasingly popular in virtual universe applications. Embodiments of the invention, therefore, allow for the commercial transfer of virtual documents 604, which other avatars may use inside and outside of the virtual universe 601. For example, because the second avatar 610 purchased the virtual document 604 in the virtual universe, the client 610 could save the document to the client's hard drive 624 or other storage media outside of the virtual universe 601.

Furthermore, the first avatar 606 lends the third avatar 620 the virtual document 604, or a copy of the virtual document 604. Lending may be performed using a lending transaction 618, like at a virtual library. The third avatar 620 could present a virtual identification card 619, like a library card, to the first avatar 606. The first avatar 606 could verify the identity of the third avatar 620, notate the identification information, then lend the virtual document 604 to the third avatar 620. The third avatar 620 could then store the virtual document 604 in a virtual storage container 621 that belongs to the third avatar 620. However, because the virtual document 604 is only being lent to the third avatar 620, the first avatar 606 could protect the virtual document 604 from being copied by locking the virtual document 604 before lending it. Furthermore, the first avatar 606 could put an expiration date on the lending period of the virtual document 604. After the expiration date expired, the virtual document 604 would automatically return to the first avatar 606.

Example Operations

This section describes operations associated with some embodiments of the invention. In the discussion below, the flow diagrams will be described with reference to the block diagrams presented above. However, in some embodiments, the operations may be performed by logic not described in the block diagrams.

In certain embodiments, the operations may be performed by executing instructions residing on machine-readable storage media (e.g., software), while in other embodiments, the operations may be performed by hardware and/or other logic (e.g., firmware). Moreover, some embodiments may perform less than all the operations shown in any flow diagram.

Figure 7:
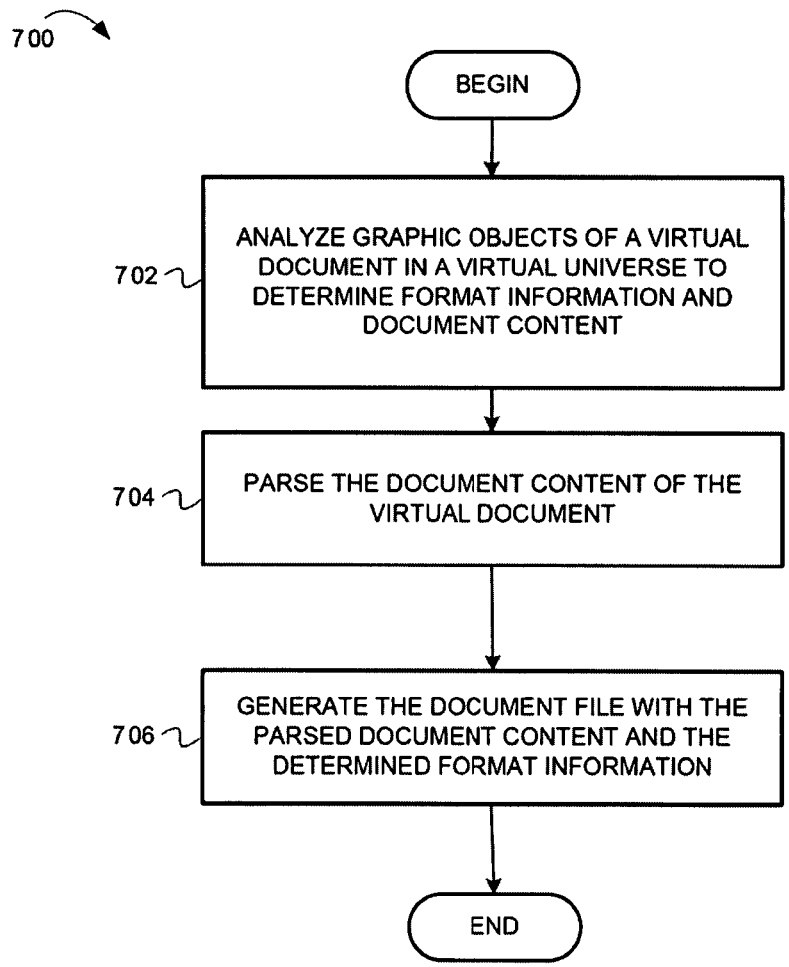
FIG. 7 is an example flow diagram 700 illustrating creating a document file from graphical objects in a virtual universe.

FIG. 7 is an example flow diagram illustrating creating a document file from graphical objects in a virtual universe. In FIG. 7, the flow 700 begins at processing block 702, where the virtual document converter analyzes graphical objects of a virtual document in a virtual universe to determine format information and document content. For example, a graphical object of a virtual document could be graphical page layers, such as a stack of JPEG format images that appear to have a text format, but the text that appears on the page layers is a pixilated representation of text, and is therefore not text. The virtual document converter determines that the graphical page layers are potential content for a document. The virtual document converter analyzes and determines that the virtual document, as a whole does not have an overall binding structure that allows all the page layers to be processed at once like a word-processor type document. Thus, the virtual document converter selects the page layers as an organized stack while storing the information about the format and potential document content for later use.

The flow 700 continues at processing block 704, where the virtual document converter parses the document content of the virtual document. For example, the virtual document converter parses the document content and creates pages of document content. If the virtual document contains graphical representations of text, the virtual document converter selects a proper conversion technique to convert the graphical representations of text on each page layer into actual text, with font formats, size formatting, etc. One such technique includes Optical Character Recognition (OCR). The virtual document converter then embeds the text into document pages. In some embodiments, however, the virtual document converter does not have to convert the graphical representations of text into text, but instead leaves the graphical representations of text alone and performs formatting that prepares the virtual document pages to be made into a document file.

The flow 700 continues at processing block 706, where the virtual document converter generates the document file with the parsed document content and the determined format information. For example, the virtual document converter applies coding that binds document pages into a document structure. The document structure includes the proper coding, or binding, to allow unit processing of the document. The virtual document converter may generate the document as one of many types of documents, such as .doc, .txt, .pdf, or any other file types associated with document related software applications. The virtual document converter may utilize print drivers to generate the documents for use with document applications.

In some embodiments, the operations may be performed in series, while in other embodiments, one or more of the operations may be performed in parallel. For example parsing the document, block 704 may be performed in parallel with generating the document.

Figure 8:
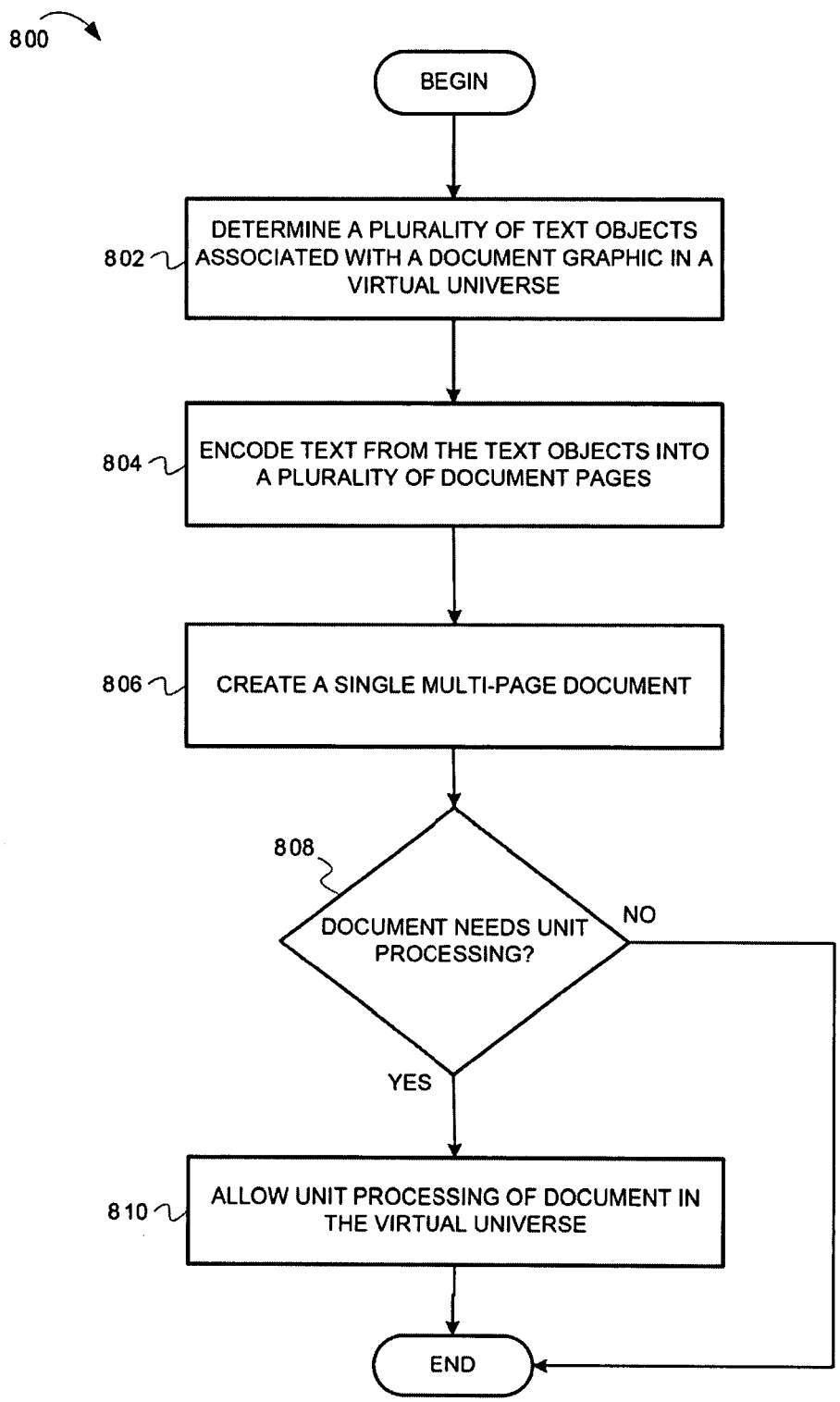
FIG. 8 is an example flow diagram 800 illustrating creating a document file from text objects in a virtual universe.

FIG. 8 is an example flow diagram illustrating creating a document file from text objects in a virtual universe. In FIG. 8, the flow 800 begins at processing block 802, where a virtual document converter determines a plurality of text objects associated with a document graphic in a virtual universe. For example, a document graphic has some objects with text included in, on, or associated with the objects. Examples of such document graphics include virtual documents, picture albums, scrolls, chat screens, help screens, and other such graphics that appear in the universe as a graphical representation of a document. Text objects include objects such as page layers of a virtual document, or talk-bubble chat screens from avatars. Some document graphics may not display text, but could include text information that is hidden, such as metadata. Document graphics do not have a page structure, or page binding, that would allow the text objects to be processed as a whole unit, like a word-processor document. Furthermore, the virtual document converter may analyze the format of the text objects to determine the type, layout, font style, etc. of text. The virtual document converter may also determine if graphical elements are inserted into the text. For example, some graphics are in line with text or referenced by the text, such as figures described in the text. The virtual document converter could later include those graphics along with the text, into a document.

The flow 800 continues at processing block 804, where the virtual document converter encodes text from the text objects into a plurality of document pages. For example, the virtual document converter creates a plurality of document pages having a sequential page order. The virtual document converter would then extract the text from the text objects and encode the text into document pages. The number of pages may correspond to the number of text objects. However, the virtual document converter could economize page numbers by determining that text from more than one text object could be included on one document page.

The flow 800 continues at processing block 806, where the virtual document converter creates a single multi-page document. For example, the virtual document converter binds the pages together into a sequential order. Consequently, the virtual document converter would encode the pages with formatting, like columns, page numbers, headers, footers, paragraphs, font and numbering schemes, etc., making the bound pages readable and processable, such as by document related software applications. As another example, the virtual document converter generates a new document file (or opens a previously created document file), and automatically extracts content from each text object and places the extracted content into pages or sections of the document file.

The flow 800 continues at processing block 808, where the virtual document converter determines whether the document needs unit processing. If the document does not need unit processing, then the process ends. Otherwise, the process continues at block 810.

The flow 800 continues at processing block 810, where the virtual document converter allows unit processing of the document in the virtual universe. Unit processing may include printing all or part of the pages of the document. Unit processing may also include saving, copying, or transferring, the document inside the virtual universe and outside the virtual universe, such as to a disk drive on a computer, or onto a network. Further, in one example, the virtual document converter processes the document without displaying the document in the virtual universe. For example, the virtual document converter displays a document graphic that represents the document in the virtual universe. The virtual document converter would associate processing options (e.g., drop-downs, commands, etc.) to the document graphic. Thus, if a processing option is selected from the document graphic, then the virtual document converter accesses the document file and executes the processing command on a hidden version of the document. Thus, the virtual document converter conserves virtual universe resources by not displaying the document file in the virtual universe interface.

Figure 9:
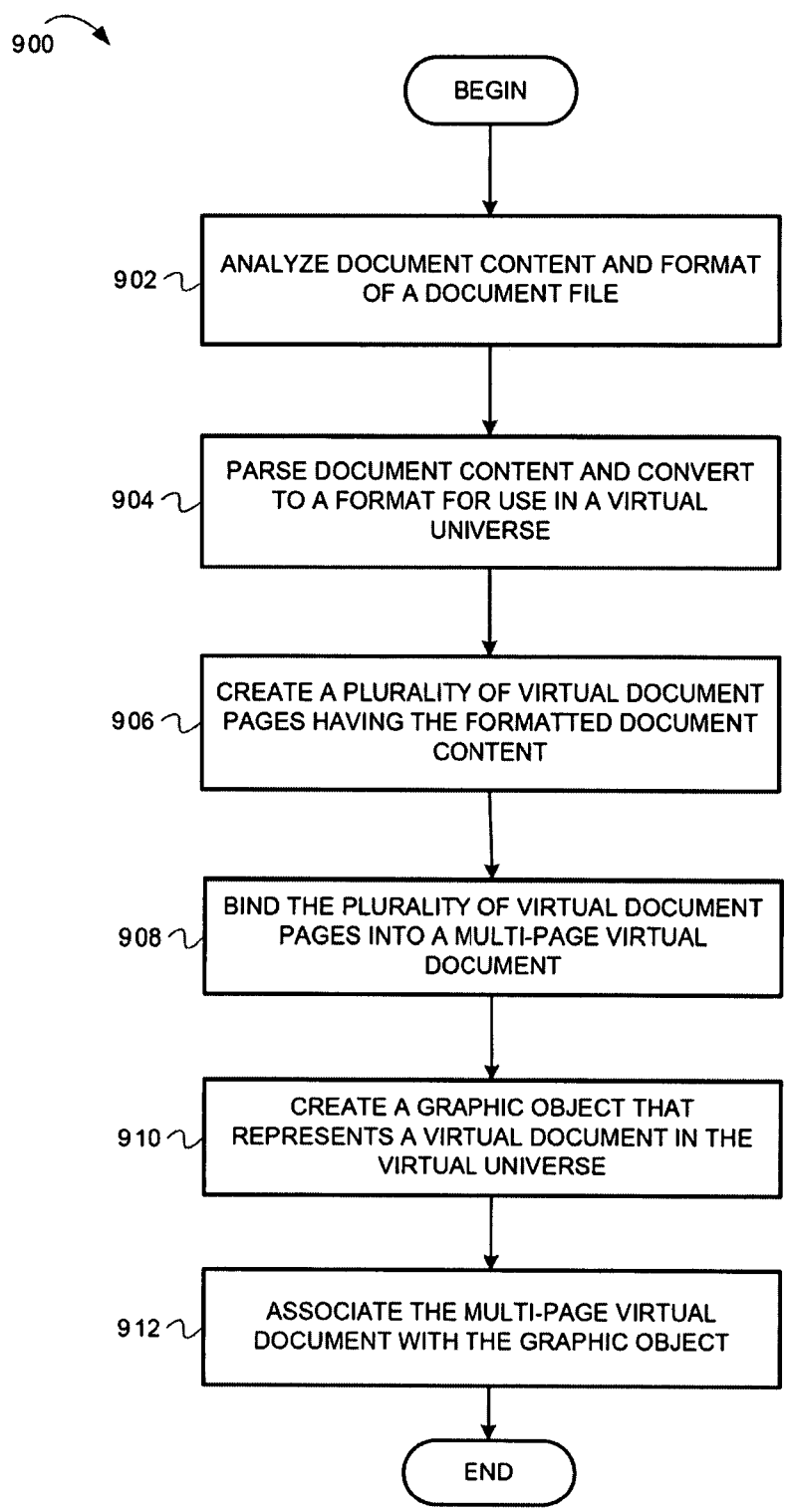
FIG. 9 is an example flow diagram 900 illustrating creating a multi-page virtual document from a document file.

FIG. 9 is an example flow diagram illustrating creating a multi-page virtual document from a document file. In FIG. 9, the flow 900 begins at processing block 902, where a virtual document converter analyzes document content and format of a document file. For example, the virtual document converter analyzes the document file type. The document may be one or many file types, including many word-processor document types (e.g., .doc, .pdf, .wpd, etc.) associated with a specific word-processing application. The document may also be a graphic file type, such as a JPEG, or a series of graphics, like a multi-page GIF, where document content could contain graphical representations of text. Furthermore, the document file could be a mixture of text and graphics. The virtual document converter may also determine a specific number of pages, font types, column numbers, etc. of the document.

The flow 900 continues at processing block 904, where the virtual document converter parses document content and converts the document content to a format for use in a virtual universe. For example, the virtual document converter converts text of the document to a textured graphic/document stack (e.g., JPEG2000, GIF, etc.), for example by using a graphical conversion driver. Alternatively, if the virtual universe handles text, then the virtual document converter may not need to convert the text format into a graphical format, but may instead only format the document pages sufficient to make the document content accessible in a virtual universe application, like a web browser. Likewise, if the document is already in a graphical format that the virtual universe can display, the virtual document converter could leave the document content in the graphical format.

The flow 900 continues at processing block 906, where the virtual document converter creates a plurality of virtual document pages having the formatted document content. For example, the virtual document converter organizes the formatted document content into a plurality of pages with a sequential order. The result is a group of virtual document pages formatted for presentation in the virtual universe.

The flow 900 continues at processing block 908, where the virtual document converter binds the plurality of virtual document pages into a multi-page virtual document. The virtual document converter binds the virtual document pages to make a multi-page, bound virtual document ("bound virtual document"), with a sequential page structure, where all of the virtual pages may be processed as a single unit in the virtual universe. For example, the bound virtual document converter could store the pages in a database with each page having an entry in the database that is tied to each other entry, such as through a key, to create a sequential page order.

The flow 900 continues at processing block 910, where the virtual document converter creates a graphical object that represents a virtual document in the virtual universe. For example, the virtual document converter could create a graphical cover to encase the bound virtual document to make the bound virtual document look like a book in the virtual universe.

The flow 900 continues at processing block 912, where the virtual document converter associates the multi-page bound virtual document with the graphical object. For example, the virtual document converter could import the bound virtual document and encase the bound virtual document with the graphical cover. Further, the virtual document converter provides the encased, bound virtual document with processing options accessible within the virtual document.

In some embodiments, the operations may be performed in series, while in other embodiments, one or more of the operations may be performed in parallel. For example block 1008, binding the virtual document pages, could be processed in parallel with block 1010, creating a graphical object that represents a virtual document in the virtual universe.

Example Virtual Document Converter Network

Figure 10:
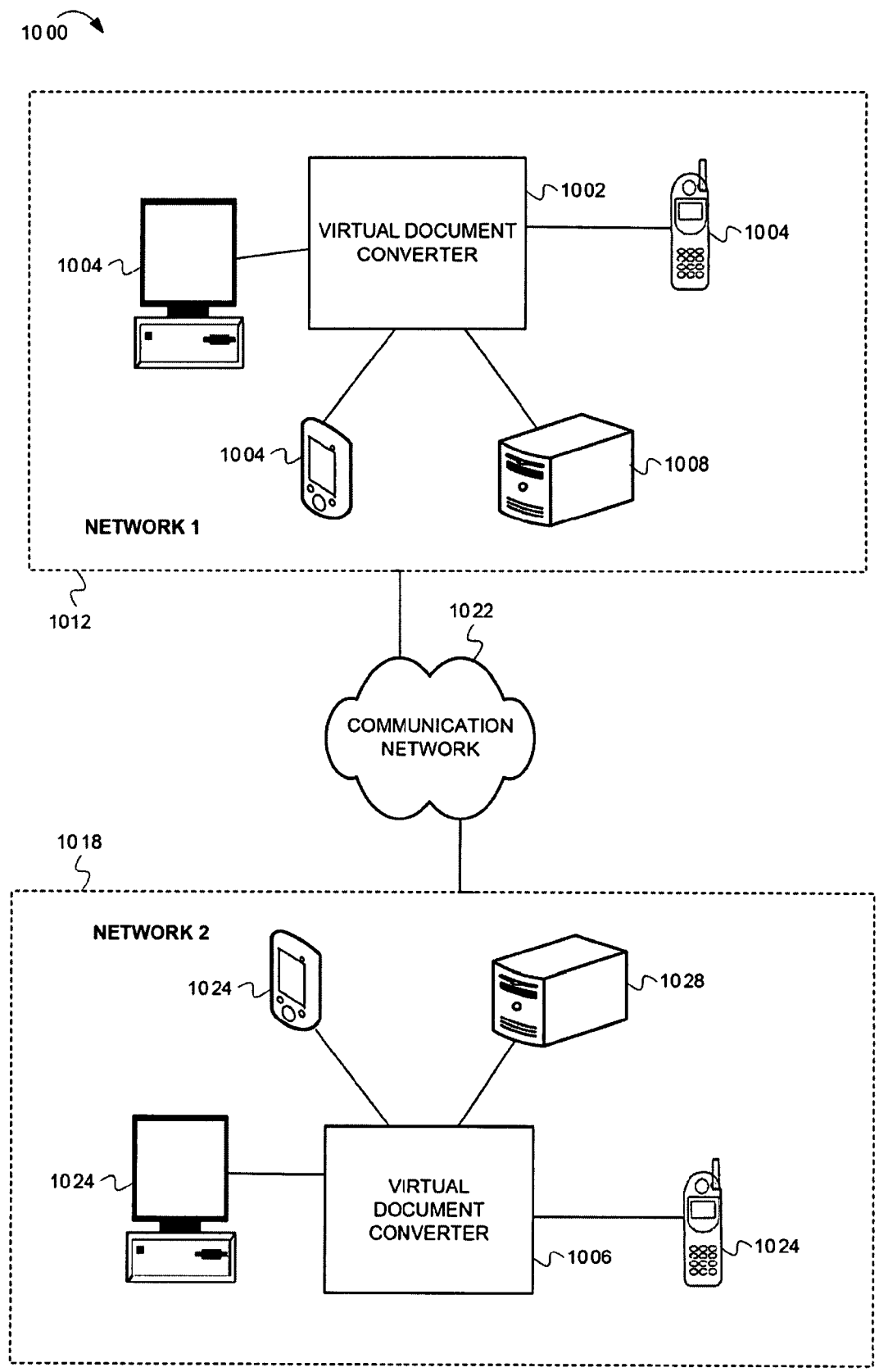
FIG. 10 is an illustration of an example virtual document converter 1002 on a network 1000.

FIG. 10 is an illustration of a virtual document converter 1002 on a network 1000. In FIG. 10, the network 1000, also referred to as a virtual document converter network 1000, includes a first local network 1012 that includes network devices 1004 and 1008 that may use the virtual document converter 1002. Example network devices 1004 and 1008 may include personal computers, personal digital assistants, mobile telephones, mainframes, minicomputers, laptops, servers, or the like. In FIG. 10, some network devices 1004 may be client devices ("clients") that may work in conjunction with a server device 1008 ("server"). Any one of the network clients 1004 and server 1008 may be embodied as the computer system described in FIG. 11. A communications network 1022 connects a second local network 1018 to the first local network 1012. The second local network 1018 also includes client 1024 and a server 1028 that may use a virtual document converter 1006.

Still referring to FIG. 10, the communications network 1012 may be a local area network (LAN) or a wide area network (WAN). The communications network 1012 may include any suitable technology, such as Public Switched Telephone Network (PSTN), Ethernet, 802.11g, SONET, etc. For simplicity, the virtual document converter network 1000 shows only six clients 1004, 1024 and two servers 1008, 1028 connected to the communications network 1022. In practice, there may be a different number of clients and servers. Also, in some instances, a device may perform the functions of both a client and a server. Additionally, the clients 1004, 1024 may connect to the communications network 1022 and exchange data with other devices in their respective networks 1012, 1018 or other networks (not shown). In addition, the virtual document converters 1002 and 1006 may not be standalone devices. For example, the virtual document converter 1002 may be distributed across multiple machines, perhaps including the server 1008. The virtual document converter 1002 may be embodied as hardware, software, or a combination of hardware and software in a server, such as the server 1008. One or both of the virtual document converters 1002 and 1006 may also be embodied in one or more client machines, possibly including one or more of the clients 1004 and 1024. For instance, servers can embody functionality (e.g., as code, a processing card, etc.) that searches a virtual universe for virtual documents that do not have a document file counterpart. Functionality for parsing and generating the virtual documents can be embodied in one or more server machines or distributed as tasks to client machines accessing the virtual universe. For example, parsing may be performed as a background task on client machines distributed by servers.

Example Virtual Document Converter Computer System

Figure 11:
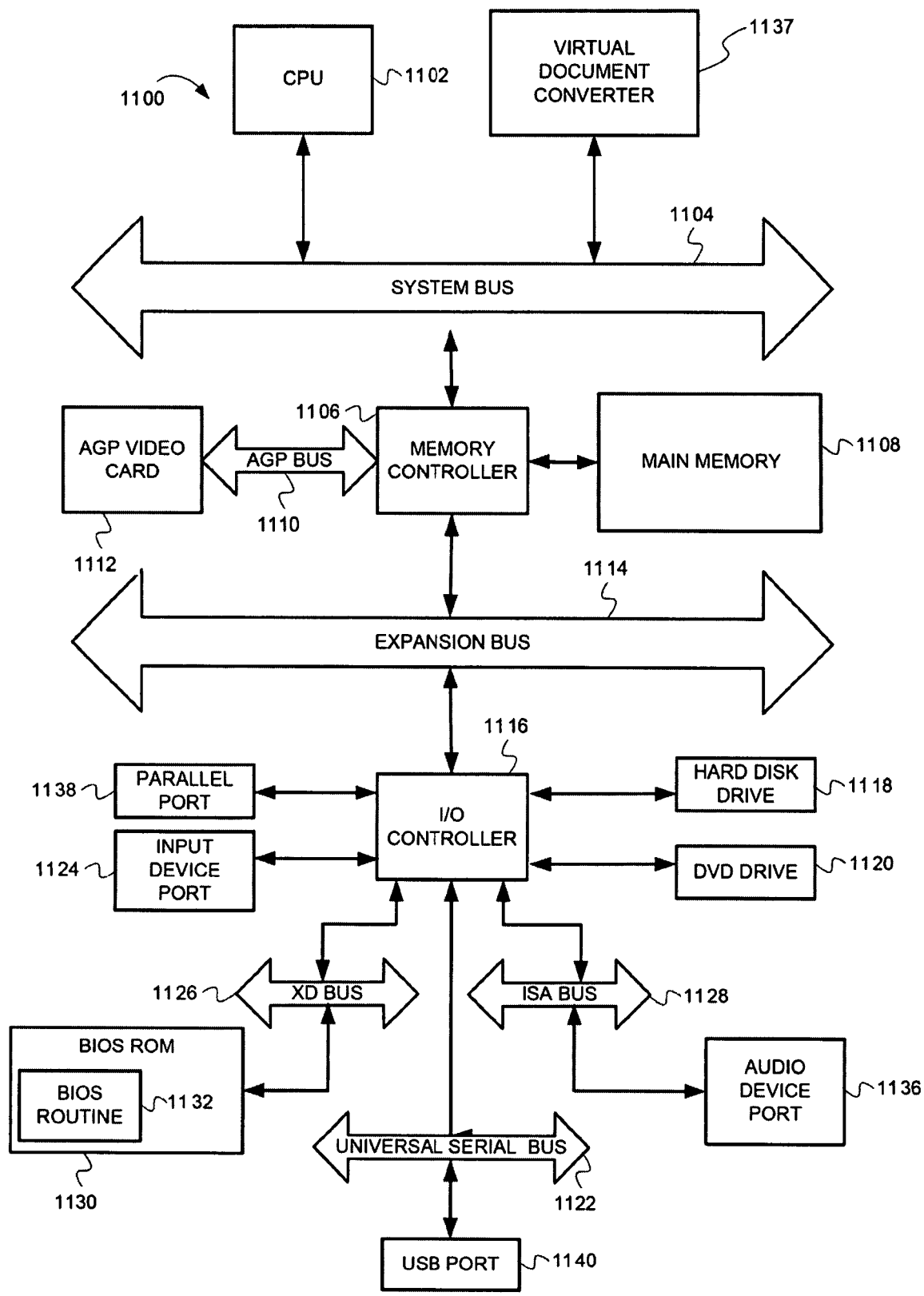
FIG. 11 is an illustration of an example virtual document converter computer system 1100.

FIG. 11 is an illustration of a virtual document converter computer system 1100. In FIG. 11, the virtual document converter 1100 ("computer system") includes a CPU 1102 connected to a system bus 1104. The system bus 1104 is connected to a memory controller 1106 (also called a north bridge), which is connected to a main memory unit 1108, AGP bus 1110 and AGP video card 1112. The main memory unit 1108 may include any suitable memory random access memory (RAM), such as synchronous dynamic RAM, extended data output RAM, etc.

In one embodiment, the computer system 1100 includes a virtual document converter 1137. The virtual document converter 1137 may process communications, commands, or other information, to create and manage document files in a virtual universe. The virtual document converter 1137 is shown connected to the system bus 1104; however the virtual document converter 1137 could be connected to a different bus or device within the computer system 1100. The virtual document converter 1137 may include software modules that utilize main memory 1108. For instance, the virtual document converter 1137 can wholly or partially be embodied as a program product in the main memory 1108. The virtual document converter 1137 can be embodied as logic in the CPU 1102 and/or a co-processor, one of multiple cores in the CPU 1102, etc.

An expansion bus 1114 connects the memory controller 1106 to an input/output (I/O) controller 1116 (also called a south bridge). According to embodiments, the expansion bus 1114 may be include a peripheral component interconnect (PCI) bus, PCIX bus, PC Card bus, CardBus bus, InfiniBand bus, or an industry standard architecture (ISA) bus, etc.

The I/O controller is connected to a hard disk drive (HDD) 1118, digital versatile disk (DVD) 1120, input device ports 1124 (e.g., keyboard port, mouse port, and joystick port), parallel port 1138, and a universal serial bus (USB) 1122. The USB 1122 is connected to a USB port 1140. The I/O controller 1116 is also connected to an XD bus 1126 and an ISA bus 1128. The ISA bus 1128 is connected to an audio device port 1136, while the XD bus 1126 is connected to BIOS read only memory (ROM) 1130.

In some embodiments, the computer system 1100 may include additional peripheral devices and/or more than one of each component shown in FIG. 11. For example, in some embodiments, the computer system 1100 may include multiple external multiple CPUs 1102. In some embodiments, any of the components may be integrated or subdivided.

Any component of the computer system 1100 may be implemented as hardware, firmware, and/or machine-readable storage media including instructions for performing the operations described herein.

The described embodiments may be provided as a computer program product, or software, that may include a machine-readable storage medium having stored thereon instructions, which may be used to program a computer system (or other electronic device(s)) to perform a process according to embodiments of the invention(s), whether presently described or not, because every conceivable variation is not enumerated herein. A machine readable storage medium includes any mechanism for storing information in a form (e.g., software, processing application) readable by a machine (e.g., a computer). A machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions in a form that is not a propagated signal.

General

This detailed description refers to specific examples in the drawings and illustrations. These examples are described in sufficient detail to enable those skilled in the art to practice the inventive subject matter. These examples also serve to illustrate how the inventive subject matter may be applied to various purposes or embodiments. Other embodiments are included within the inventive subject matter, as logical, mechanical, electrical, and other changes may be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for generating a document file in a virtual universe, the method comprising the step of:
a computer determining format information from graphical objects that have an appearance of a multi-page virtual document in the virtual universe, wherein the virtual universe is a computer-based simulated environment populated by one or more avatars, and wherein the step of the computer determining the format information comprises the computer determining that the graphical objects comprise graphical representations of text;
the computer determining a relationship between the graphical objects, wherein the relationship indicates that the graphical objects are organized into a stack that represents page layers of the multi-page virtual document;
the computer converting the graphical representations of text to textual characters;
the computer generating the document file, in the virtual universe, with document pages that contain the textual characters; and
the computer organizing the document pages based on the relationship between the graphical objects.

2. The method of claim further comprising the step of:
the computer processing the document file as a single, multi-page document in the virtual universe.

3. The method of claim 2, wherein the step of the computer processing the document file as the single, multi-page document in the virtual universe comprises the steps of:
the computer causing to be performed, from within the virtual universe, one or more of printing the document file, saving the document file, transferring the document file within the virtual universe, separating a page from the document file to be transferred within the virtual universe, creating a shortcut to the document file, attaching the document file to an email, lending the document file, locking the document file, and retrieving the document file from a borrower.

4. The method of claim 1 further comprising the steps of:
the computer determining that the graphical objects include text in addition to the textual representations of text, and
the computer copying the text into the document pages.

5. The method of claim 1, wherein the step of the computer generating the document file, in the virtual universe, comprises the steps of:
the computer determining that the page layers of the virtual document are organized only for sequential navigating in an order within the stack; and
the computer binding the document pages to have both a sequential and non-sequential navigable structure among the document pages.

6. The method of claim 1, wherein the step of the computer generating the document file comprises the steps of:
the computer generating a first number of the document pages that are equivalent to a second number to the page layers; and
the computer organizing the first number of document pages in a first order that follows a second order in which the second number of page layers are organized.

7. The method of claim 1, wherein the step of the computer determining the format information from the graphical objects comprises the step of:
the computer determining that the graphical objects are formatted as textured graphics that have an appearance of one or more of a picture album, a scroll, a talk-bubble from an avatar, a chat screen, and a help screen in the virtual universe.

8. The method of claim 1 wherein the step of the computer determining the relationship between the graphical objects comprises the step of the computer analyzing a structure of the graphical objects as the page layers of the organized stack; and wherein the step of the computer organizing the document pages based on the relationship between the graphical objects comprises the step of the computer maintaining the structure of the page layers in the organized stack.

9. A computer system for generating a document file in a virtual universe, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, to determine format information from graphical objects that have an appearance of a multi-page virtual document in the virtual universe, wherein the format information indicates that the graphical objects comprise graphical representations of text;
program instructions, stored on at least one of the one or more storage devices for execution by at least one of the one or more processors via at least one of the one or more memories, to determine a relationship between the graphical objects, wherein the relationship indicates that the graphical objects are organized into a stack that represents page layers of the multi-page virtual document;
program instructions, stored on at least one of the one or more storage devices for execution by at least one of the one or more processors via at least one of the one or more memories, to convert the graphical representations of text to textual characters;
program instructions, stored on at least one of the one or more storage devices for execution by at least one of the one or more processors via at least one of the one or more memories, to generate the document file, in the virtual universe, wherein the document file comprises document pages that contain the textual characters; and
program instructions, stored on at least one of the one or more storage devices for execution by at least one of the one or more processors via at least one of the one or more memories, to organize the document pages based on the relationship between the graphical objects.

10. The computer system of claim 9, further comprising:
program instructions, stored on at least one of the one or more storage devices for execution by at least one of the one or more processors via at least one of the one or more memories, to control movement of the document file inside the virtual universe; and
program instructions, stored on at least one of the one or more storage devices for execution by at least one of the one or more processors via at least one of the one or more memories, to process the document file in the virtual universe.

11. The computer system of claim 9 further comprising:
program instructions, stored on at least one of the one or more storage devices for execution by at least one of the one or more processors via at least one of the one or more memories, to one or more of store the document file in an inventory associated with an avatar inside the virtual universe, and transfer at least a portion of the document file to an inventory associated with an avatar inside the virtual universe.

12. The computer system of claim 9, wherein the program instructions to generate the document file:
generate a first number of the document pages that are equivalent to a second number to the page layers; and
organize the first number of document pages in a first order that follows a second order in which the second number of page layers are organized.

13. A computer program product for generating a document file in a virtual universe, the computer program product comprising:
one or more machine-readable tangible storage devices;
program instructions, stored on at least one of the one or more storage devices, to determine format information from graphical objects that have an appearance of a multi-page virtual document in the virtual universe, wherein the format information indicates that the graphical objects comprise graphical representations of text;
program instructions, stored on at least one of the one or more storage devices, to determine a relationship between the graphical objects, wherein the relationship indicates that the graphical objects are organized into a stack that represents page layers of the multi-page virtual document;
program instructions, stored on at least one of the one or more storage devices, to convert the graphical representations of text to textual characters;
program instructions, stored on at least one of the one or more storage devices, to generate the document file, in the virtual universe, wherein the document file comprises document pages that contain the textual characters; and
program instructions, stored on at least one of the one or more storage devices, to organize the document pages based on the relationship between the graphical objects.

14. The computer program product of claim 13 wherein the program instructions to determine the relationship between the graphical objects analyze a structure of the graphical objects as the page layers of the organized stack, and wherein the program instructions to organize the document pages based on the relationship between the graphical objects maintain the structure of the page layers in the organized stack.

15. The computer program product of claim 13 further comprising:
program instructions, stored on at least one of the one or more storage devices, to determine that the graphical objects include text in addition to the textual representations of text, and
program instructions, stored on at least one of the one or more storage devices, to copy the text into the document pages.

16. The computer program product of claim 13, wherein the program instructions to generate the document file:
determine that the page layers of the virtual document are organized only for sequential navigating in an order within the stack, and
bind the document pages to have both a sequential and non-sequential navigable structure among the document pages.

17. The computer program product of claim 13, wherein the program instructions to generate the document file:
generate a first number of the document pages that are equivalent to a second number to the page layers, and
organize the first number of document pages in a first order that follows a second order in which the second number of page layers are organized.

* * * * *